United States Patent [19]

Mack et al.

[11] 4,316,078
[45] Feb. 16, 1982

[54] FOOD SERVING SYSTEM

[75] Inventors: Anthony C. Mack, North Reading; Robert A. Phillips, Wayland; George K. Shumrak, Natick, all of Mass.

[73] Assignee: Sweetheart Plastics, Inc., Wilmington, Mass.

[21] Appl. No.: 106,460

[22] Filed: Dec. 26, 1979

Related U.S. Application Data

[63] Continuation-in-part of Ser. No. 868,072, Jan. 9, 1978, abandoned.

[51] Int. Cl.³ .............................................. H05B 1/02
[52] U.S. Cl. ...................................... 219/386; 219/486; 219/483; 219/492; 219/407; 219/523; 99/327
[58] Field of Search ............... 219/486, 483, 494, 407, 219/403, 492, 201, 385, 386, 523, 387, 400, 404; 99/328, 447, 327

[56] References Cited

U.S. PATENT DOCUMENTS

| | | | |
|---|---|---|---|
| 3,358,924 | 12/1967 | Goodhouse et al. | 219/492 X |
| 3,496,337 | 2/1970 | Voglesonger | 219/486 |
| 3,666,921 | 5/1972 | Shevlin | 219/492 |
| 3,699,307 | 10/1972 | Malkin | 219/492 |
| 3,721,805 | 3/1973 | Barratt | 219/492 |
| 3,800,123 | 3/1974 | Maahs | 219/407 |
| 3,808,402 | 4/1974 | Rea | 219/483 |
| 3,814,900 | 6/1974 | Frey et al. | 219/218 |
| 3,924,100 | 12/1975 | Mack et al. | 219/521 |
| 3,982,097 | 9/1976 | Seider et al. | 219/483 |
| 4,041,277 | 8/1977 | Shumrak et al. | 219/403 |

FOREIGN PATENT DOCUMENTS

839551 6/1960 United Kingdom ............... 219/492

Primary Examiner—B. A. Reynolds
Assistant Examiner—M. Paschall
Attorney, Agent, or Firm—Wolf, Greenfield & Sacks

[57] ABSTRACT

An energy saving food serving system for rethermalization of the food and for delivery prepared meals to locations remote from the place of preparation, such as to patients to hospitals and nursing homes. The system includes a mobile cart having its own rechargeable power pack that is utilized to propel the cart. The cart has separate bays, each having a tier of racks for carrying individual food serving trays. Each tray has one or more thermally isolated heat transfer devices which are selectably energized when the tray is in place on a rack in the cart. Preferably, each tray has a pair of heaters referred to herein as plate and bowl heaters and adapted to be operated by control means in either a continuous mode of operation or a rethermalization mode of operation. In the rethermalization mode of operation to manually selected heaters associated with trays in all bays are operated for a predetermined period of time of, for example, 25 minutes, to rethermalize the food from a frozen or at least cold state to a temperature on the order of 170° F.–180° F. Thereafter, the heaters in predetermined bays are operated cyclically to hold the food at the desired temperature range. During the initial predetermined period of the rethermalization mode the heaters may be operated on a continuous "on" basis or may be operated cyclically but preferably at a higher duty cycle and in the maintaining state which follows the predetermined period.

22 Claims, 9 Drawing Figures

FOOD SERVING SYSTEM

RELATED APPLICATION

This is a continuation-in-part of application Ser. No. 868,072 filed Jan. 9, 1978, now abandoned.

BACKGROUND OF THE INVENTION

The present invention relates in general to a mobile food serving system characterized by being energy saving, and pertains, more particularly, to a system for thermalizing the food, maintaining the food in a heated edible condition, and delivering the prepared meals to locations remote from the place of preparation. The system of this invention may have use in the feeding of patients in hospitals, nursing homes, airlines and other institutions. It may also be used in the feeding of hotel guests. Also, although the principles of this invention are preferably applied to a mobile system, they may also be applied to a stationary food serving system.

U.S. Pat. No. 3,924,100 discloses a mobile food serving system that is adapted for the delivery of prepared meals from a central location and with the maintenance of the proper temperature of these meals. This patent discusses in some detail the disadvantages associated with both a centralized system and a decentralized system. It appears that the centralized system may be more desirable from a standpoint of cost and efficiency. Even so, with this centralized system, there is still a requirement for a large heating apparatus such as steam pans or convection ovens in the central area. With these systems the food is, after rethermalization, placed on trays and delivered to the patients on different floors.

Many of the other systems now used especially in hospitals employ the centralized control with the use of microwave ovens for heating, preferably at each floor where food is to be served. At first appearance it would seem that the rapid heating available with the microwave system would provide some time and cost saving. However, a decentralized microwave system is extremely labor intensive requiring an excessive number of steps of handling the food. With such a system, once the food has been transported to the floor, each dinner must be removed and individually heated and then groups of dinners are served, usually in relatively small groups in order to maintain the food suitably heated. There is therefore a requirement for substantial help in the hospital for handling these steps that totally negates any advantage to the use of microwave energy.

It is an object of the present invention to take more full advantage of the centralized system by providing a food serving system that itself provides rethermalization and delivery of the meals. The rethermalization and the delivery system is preferably embodied in a single unit in the form of a self-powered cart.

Another object of the present invention is to provide an improved mobile food serving system that will enable simplification of the main preparation area by substantially reducing the need for large heating apparatus such as steam pans or convection ovens located in the main preparation area. Further, because of the use of this centralized delivery system there will be a significant cost saving in that substantially no extensive support equipment will be required on each floor.

Still another object of the present invention is to provide a food serving system having energy saving features. Because the mobile system is transported from place-to-place the system is provided with its own storage battery or group of batteries. However, in order to conserve the life of these batteries, the system of this invention makes optional use of a conventional power line such as the 110 VAC line. In that way the on board battery can be used primarily only for transportation purposes with most of the food heating being provided via an AC source. Furthermore, in accordance with the invention, food heater operation is controlled so as to maintain battery drain relatively constant. Thus, when a pulsed heating mode is employed, as defined hereinafter, it is preferred that not all tray heaters be on at the same time but rather that some heaters are on while others are off and vice versa. In this way battery drain is kept more constant and periodic surges are minimized.

SUMMARY OF THE INVENTION

To accomplish these and other objects, this invention includes among its features, a self-contained mobile cart for carrying and rethermalizing the food and thereafter delivering the meals. Separate removable food serving trays are used for each patient along with individual dishes, plates, bowls, etc. to be carried on the trays and which may be like those used in the home. The cart carries its own rechargeable low voltage battery pack, which selectively supplies the necessary energy to each tray to maintain selected portions of the tray at the desired temperature. The trays each include preferably two isolated heaters that may be positive temperature coefficient type heaters. In the disclosed embodiment these heaters are referred to as plate and bowl heaters for each tray.

With the system of this invention, the unheated, possibly even frozen, meal is placed on a tray hours or possibly even a day or more before the meal is to be served. The entire cart may be stored in a central holding refrigerator. This arrangement eliminates the extra labor that is necessary to assemble the meal at the time it is to be served. Approximately one half to one hour before meal time the fully assembled cold trays are heated by activating the plate and bowl heaters as required. When the cart is fully loaded and programmed, it is delivered to the desired floor. While this delivery is taking place, the food is being rethermalized automatically, with an indicator for indicating when the meal is ready to be served. Should the meal not be removed at the time that it is ready, in accordance with the control of this invention a holding cycle is used so as to provide sufficient heat to hold the meal in a temperature range of about 140° F.–160° F. In one embodiment of the invention the rethermalization occurs over a period of 25 minutes and for an additional period of say 5 minutes the heaters are operated on an on-off cycle which may be at a 50% duty cycle. After this 5 minute repeat cycle the food is ready to be served. However, if it is not then served, the on-off cycle of the heaters continues to maintain the food at the proper temperature.

In one embodiment cycling operation associated with each tray is terminated preferably a predetermined period of time after removal of that tray. In an alternate arrangement of the invention all cycling operation is terminated automatically upon removal of the last tray in the cart.

In one embodiment of the present invention the ready condition is registered for essentially all tray locations. However, it may be desirable in some other cases, wherein trays may be loaded at different times, to have a ready condition associated with each tray. Thus, in an alternate embodiment a ready light is associated with each heater or heaters corresponding to a tray. In such an embodiment separate time delays are also used in conjunction with each tray heater or heater array.

In the embodiment just described the heat maintenance, after rethermalization, occurred by means of a cycling operation. However, in another arrangement two heaters may be employed, one a higher powered heater for rethermalization and the other a lower powered heater for food temperature maintenance. In this way, rather than cycling the food after it has been properly rethermalized, the lower power heater may be activated so as to provide a constant lower power heating quantity to the food. In still a further arrangement, rather than employing two separate heaters, there could be provided two separate controls for changing the current sent to a single heater so that a larger magnitude current is used during a first phase for rethermalization and a lower magnitude current is sent to the sole heater thereafter for food temperature maintenance.

In accordance with another feature of the present invention cycling may be provided for both rethermalization and food temperature maintenance. However, in that case, the cycling would be provided at different duty cycle with their being provided a higher duty cycle signal for rethermalization with a lower duty cycle being provided after thermalization for food temperature maintenance.

Another feature of the present invention is to provide a food serving system that is characterized by energy saving aspects so that when the cycling of heaters occurs, the "on" period of the heaters does not all occur at the same time but is instead staggered between different heaters so as to equalize the battery drain and minimize abrupt surges of energy required to be supplied by the battery pack.

BRIEF FIGURE DESCRIPTION

Numerous other objects, features and advantages of the invention should now become apparent upon a reading of the following detailed description taken in conjunction with the accompanying drawings, in which.

DETAILED DESCRIPTION

Figure 1:
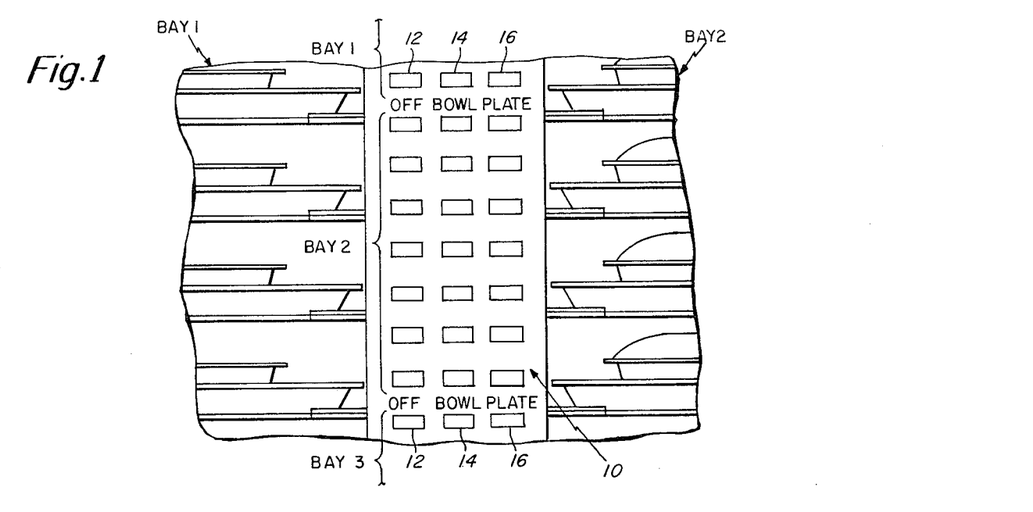
FIG. 1 is a front fragmentary view of a cart constructed in accordance with this invention and showing in particular the tray control panel.
Figure 2A:
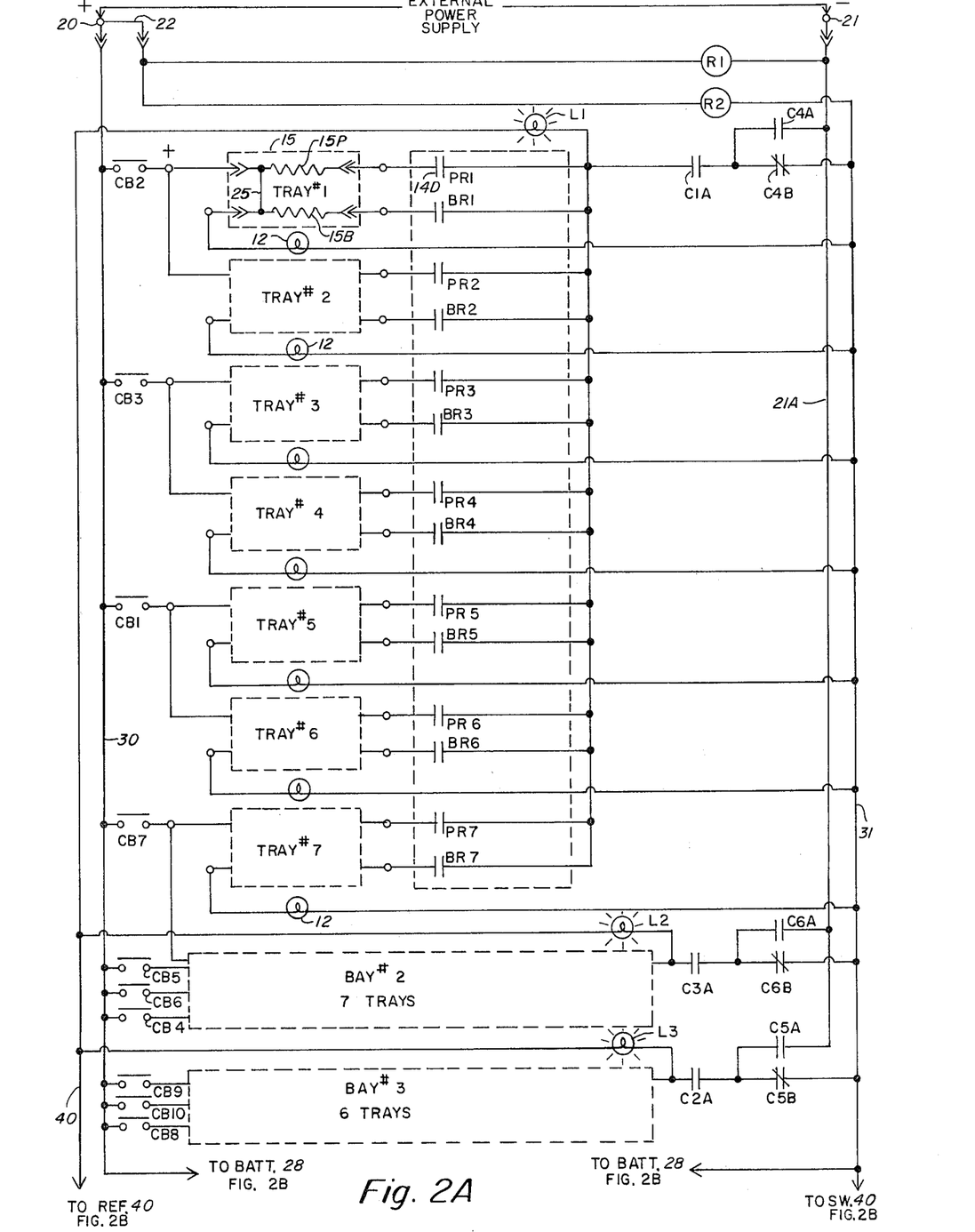
FIGS. 2A-2B show a total electronic system in accordance with the invention and employing the cycle control for rethermalization.
Figure 2B:
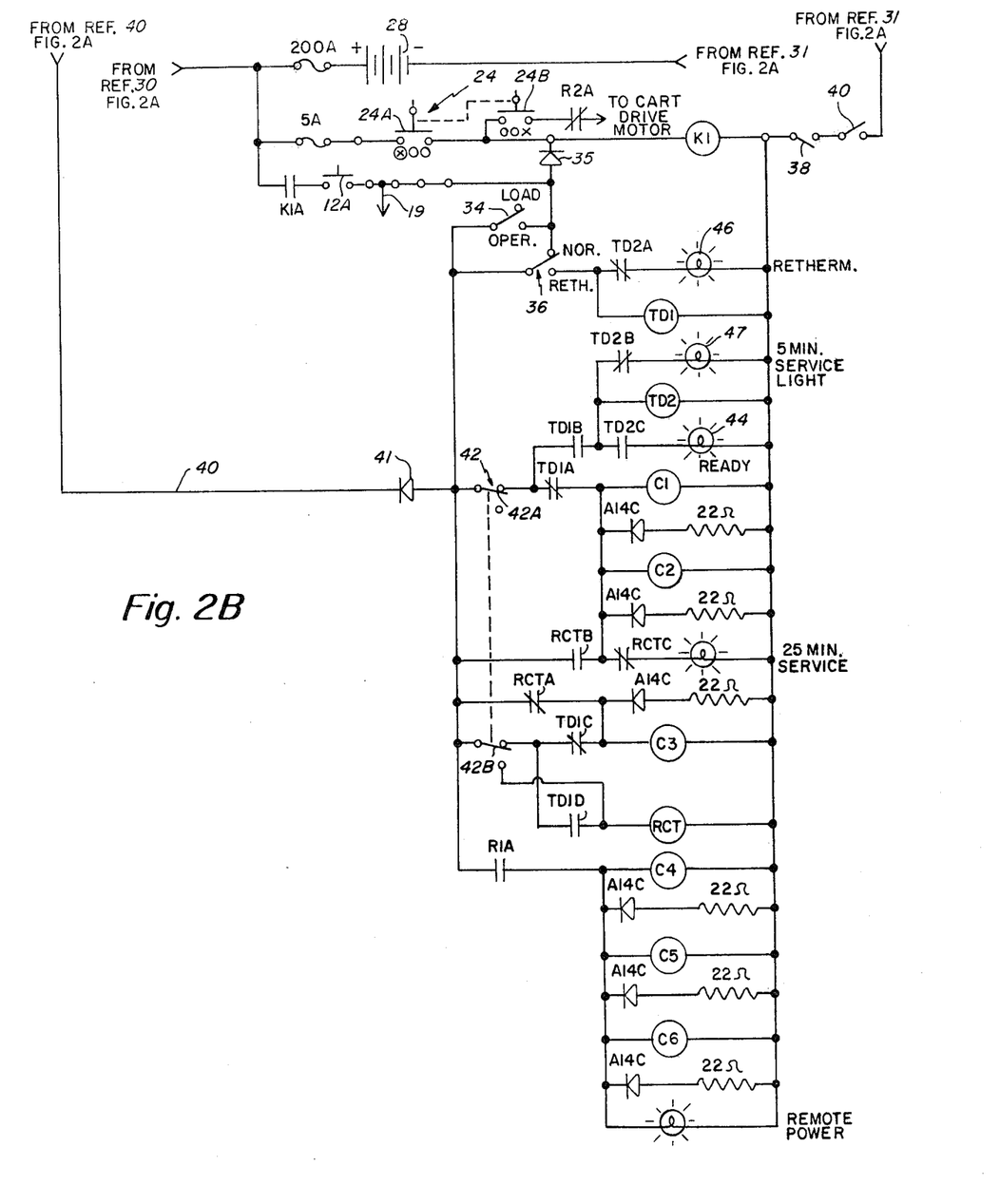

U.S. Pat. No. 3,924,100 shows a typical cart construction, the entire construction of which is not discussed in detail herein. The preferred cart construction of this invention has three days identified hereinafter as bays #1, #2, and #3, each having racks for supporting a plurality of trays in each bay. FIG. 1 herein is a fragmentary view of a portion of the cart showing two of the bays and, disposed therebetween, a control panel 10. In addition, there is another control panel not specifically shown in the drawings but similar to the control panels shown in FIG. 2 of U.S. Pat. No. 3,924,100 and including, for example, an on-off switch, an operate/load switch, a mode switch and associated indicators all discussed hereinafter with reference to FIG. 2.

The control panel 10 supports three columns of push-to-light switches. Each horizontal row which comprises the three switches represent the controls for a single tray associated therewith. The first vertical column of switches 12 are for indicating that the corresponding tray is in place on the rack associated with that position and also serves as an "off" or "program clear" for that station. When the tray is in place, the indicator 12 is illuminated and when the tray is not completely in place, the indicator is not illuminated. The adjacent two vertical columns comprise, respectively, bowl switches 14, and plate switches 16. These switches or buttons 14 and 16 are for selectively operating the heat transfer devices or heaters which are independently operated and which are provided in each tray. In an alternate embodiment a single heater may be used in which case only one of the switches 14 and 16 may be necessary.

Figure 3:
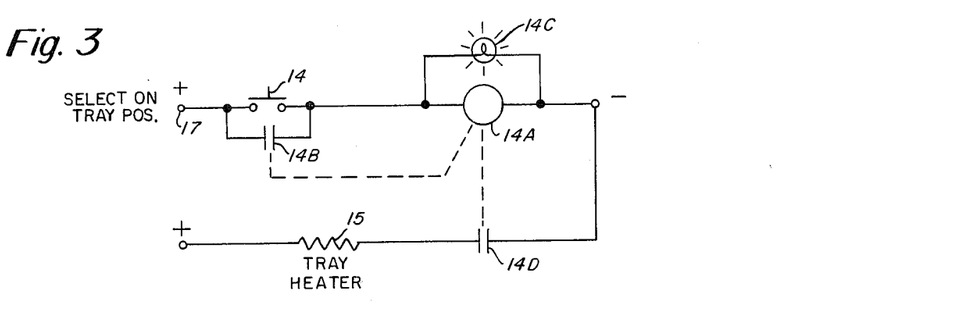
FIG. 3 is a circuit diagram of an embodiment of the heater control buttons shown in FIG. 2.

The push-to-light switches 14 and 16 may be of conventional design. FIG. 3 shows one typical embodiment including a relay 14A in series with the switch 14. A contact 14B of the relay is coupled across the switch 14 so that upon momentary operation of the switch 14 the relay 14A energizes and is latched in that position by way of the contact 14B. The light portion of the switch 14 is depicted in FIG. 3C by the indicator 14C.

FIG. 3 also shows a second contact 14D of the relay 14A. This contact 14D is coupled in series with the tray heater 15. FIG. 2 also shows schematically the contact 14D and associated heater 15. The contact 14D and heater 15 are coupled across the voltage source as long as the particular bay is selected. However the positive voltage input to terminal 17 of FIG. 3 is coupled from line 19 of FIG. 2B so that the voltage available at the bowl and plate switches or buttons is a voltage that is only present after momentary movement to the "tray" position and is maintained in all positions of switch 24.

FIG. 12 is an electronic schematic diagram associated with the system of this invention and including the control for the rethermalization or reconstitution mode of operation. In FIG. 2 an external power supply is coupled between terminals 20 and 21. This power may be provided from a conventional AC source coupled by way of a converter to provide a positive voltage at terminal 20 and a negative or ground voltage at terminal 21. These voltages at terminals 20 and 21 are coupled respectively to lines 20A and 21A for providing power to the three bays disclosed in FIG. 2. The bay #1 is shown in detail while the bays #2 and #3 are shown only in block form as they are substantially of the same construction as the first bay.

When the external power is applied, the relay R1 is latched. When this occurs its associated contact R1A closes thereby in turn latching the relays C4, C5 and C6. Each of the relays C4, C5 and C6 has associated therewith a coil suppressor circuit comprising a diode and resistor in series coupled across each of these relays as depicted in FIG. 2. Upon energization of these relays C4–C6 the associated normally open contact closes and power is provided from terminal 21 to one side of a further contact C1A, for example. In FIG. 2 the contacts that control power to each of the bays are contact C1A for bay #1, contact C3A for bay #2, and contact C2A for bay #3. When external power is being used, the power is coupled to bay #1 by way of the contact C1A in series with the contact C4A.

When external power is being used, the connection 22 at terminal 20 also causes the relay R2 to be operated. This relay has associated therewith a contact R2A which is normally closed except when the relay R2 is energized. Thus, when external power is used, the contact R2A is open and all power to the cart drive motor is interrupted even if the switch 24 is operated to its "drive" position. The switch 24 has a first position 24A for controlling the "tray" position of the switch and a second position 24B for controlling the "drive" position of the switch. Thus, if the cart is put into the "drive" position by switch 24 with external power applied, this power will not be coupled to the drive motor because of the interrupting contact R2A. Once the external connector is removed, the relay R2 de-energizes and then power to the drive motor may occur through the operation of the switch 24 to its "run" position.

In FIG. 3 there is considered an embodiment for one of the many push button switches that are used for selecting the heaters which in the disclosed embodiment comprise a bowl and plate heater associated with each tray. In FIG. 2, for example, there is shown tray #1 in bay #1 having associated therewith two heaters 15 which may be identified as a bowl heater 15B and a plate heater 15P. Each tray also has a shorting conductor wire 25 so that when the tray is plugged in a voltage signal from line 20 by way of a circuit breaker is coupled by way of the conductor wire 25 through the indicator 12 for indicating that the associated tray is in place. Once the tray is in place, then onr or the other or both heaters may be selectively operated through their associated push buttons such as the button 14 as shown in FIG. 3. For example, in bay #1, tray #1, if both of the bowl and plate switches are operated, then the contacts PR1 and BR1 are both closed coupling power from the contact C1A to both of the heaters 15B and 15P.

The heater elements 15B and 15P are schematically shown herein. However, it is understood that each of these heaters may actually comprise one or more heater elements. In the preferred embodiment of the invention a plurality of positive temperature coefficient (PTC) pellets are used. These pellets may be of the type manufactured by Texas Instrument Company. See U.S. Pat. No. 3,924,100 for one detail of an arrangement of these heaters.

The PTC pellets are basically multi-modal resistance heaters. Below their critical temperature which may range from 120° F. to 400° F. depending upon composition, they have a low electrical resistance, while above the range the resistance is very high. These heaters are designed to operate at a relatively narrow range of temperatures depending upon their composition. Thus, if the plate or bowl is colder than intended, the heater operates at a higher wattage output to quickly heat the bowl or plate. Once the proper temperature has been attained, then the resistance increases and the heating reduces substantially.

In the construction shown in U.S. Pat. No. 3,924,100 the heaters were primarily used for maintaining the temperature of food. However, in accordance with one mode of operation of the present invention it is intended that the heaters be used for rethermalization or reconstitution of the food. Accordingly, the designs of the specific PTC elements are different. For the bowl heater the PTC element is selected so that the surface of the heater is in the temperature range of 270° F.–280° F. For the plate heater the surface temperature of the tray is on the order of 240° F.–250° F. The bowl heater is designed to provide a power output in the range of 35–40 watts while the plate heater is in the range of 60–80 watts primarily because of the larger surface of heating that is necessary with the plate in comparison to the bowl.

In accordance with the invention there is initially a continuous mode of operation for reconstitution followed by a maintaining mode of operation which may be accomplished in the preferred embodiment by a cycling of the heaters. In an alternate arrangement the maintenance mode may also be accomplished by a drop in the heater voltage or by providing additional heaters and sequencing between groups of heaters. The end result is to provide a continuous cycle so that the food can be raised from a temperature of say 40° F. to a temperature range on the order of 160° F.–180° F. Thereafter, the PTC heaters are operated in one embodiment in a cyclic manner so as to maintain the temperature of the food in the range on the order of 140° F.–160° F.

It is preferred that the internal battery 28 be used primarily for propelling the cart although this battery is also used for heating, by way of lines 30 and 31 which couple by way of, for example, contacts C4B and C1A to each bay to provide power thereto. For bay #2 this power is coupled by way of contacts C6B and C3A and for bay #3 the power is coupled by way of contacts C5B and C2A. When the external power is removed, the relay R1 becomes de-energized as do the relays C4–C6. Under that condition the contacts C4B, C5B and C6B close and thus all power is coupled from the battery 28 and not from the remote terminals 20 and 21.

As previously indicated, the power to the bays is controlled by the relays C1–C3. An indication of each bay being powered is by means of the indicators L1–L3. In accordance with one mode of operation wherein the power to the bays is cycled, the indicators L1 and L3 may be illuminated at one time and only the indicator L2 at another time.

The control circuitry of FIG. 2 comprises, in addition to the switch 24, a load/operate switch 34, a normal/rethermalization switch 36, a door interlock switch 38, an off-on switch 40, and repeat cycle timer switch 42. Also shown in FIG. 2 are time delays TD1 and TD2 and the repeat cycle timer RCT.

In the "drive" position of the switch 24 when the contact 24B is closed and assuming that external power is not being used, the contact R2A is also closed and power is coupled to the cart drive motor under some type of manual control not disclosed in detail herein. In this mode of operation the contact 24A is open but the relay K1 is in its latched state because there was a previous momentary operation of switch 24 to the "tray" position which energized relay K1. The relay K1 was maintained in this latched state by way of its latching contact K1A. The drive by way of contact 24B can only occur when there is an initial operation of the contact 24A when the switch 24 is put in the "tray" position.

When, for example, trays are to be loaded into the cart then the switch 24 is moved to its "tray" position. The contact 24B is open and the contact 24A is momentarily closed. The relay K1 is latched assuming that the door interlock switch 38 is closed and that the switch 40 is in its "on" position. The door interlock switch 38 will be open if the rear door of the cart is opened for the purpose of charging the battery 28. Thus, under the condition of recharging of the battery, the relay K1 is not latched and no type of control is possible. Assuming that the door is closed because the battery is not being recharged, then the relay K1 may latch when the switch 40 is closed. When this occurs its associated contact K1A closes providing power to line 19 and also by way of diode 35 to the switches 34 and 36. The power on line 19 couples to the button circuitry in each of the bays as exemplified by the terminal 17 in FIG. 3. Thus, the power to the buttons such as button 14 in FIG. 3 is selected based upon the position of the switch 24.

When the switch 36 is in its "normal" mode the switch 34 is essentially by-passed and power is coupled to line 40 by way of diode 41 for the purpose of illumination of the indicators L1-L3, and is also coupled by way of the contacts 42A and 42B of switch 42 to the relays or contactors C1, C2 and C3. Thus, in this mode of operation, all three of the bays are enabled through the contactors C1, C2 and C3. Thus, in this mode of operation, all three of the bays are enabled through the contactors C1, C2 and C3 and any of the selected trays have their heater or heaters operating depending upon the selection that has been made. In the "normal" position of the switch 36 the time delay TD1 is not operated and thus its contacts TD1A and TD1C are closed, as shown, and all of the contactors are operated. Accordingly, the associated contacts C1A, C2A and C3A are closed and power is coupled to each bay.

When the mode switch 36 is moved to its "rethermalization" position, then the power is coupled to the time delay TD1 which may be a 25 minute time delay. If it is assumed that the switch 34 is in its "operate" position, then the power is coupled by way of switch 34 and switch 36 to the time delay TD1. On the other hand, if the switch 34 is in its "load" position, then power is interrupted to the switch 36 while the trays are being loaded into the cart. Thereafter, the switch 34 is moved to its "operate" position for providing the programming in accordance with this invention.

Although it is preferred to use a mechanical switch 36 or the like, this may be replaced by a jumper arrangement which can be jumpered in either the retherm position or the normal position.

During the initial time delay interval defined by delay TD1 which is part of the rethermalization or reconstitution interval, the contacts TD1A and TD1C are still closed and thus all of the bays are enabled with any tray capable of receiving heating power as a function of the operation of the switches associated with each tray to select either or both of the heaters on a tray. During the rethermalization interval, the contact TD1B is open, as shown, and thus there is no power provided to the second time delay TD2. Also, because of this open contact, there is no power provided to the ready light 44 which coupled in series with the contacts TD1B and TD2C. Also, the contact TD1D is still in its closed position, as shown, and thus the repeat cycle timer RCT is not yet operated.

After the termination of the rethermalization interval (25 minute interval), the time delay TD1 is operated so as to change the state of the contacts as depicted in FIG. 2. Thus, the contact TD1A and the contact TD1C open interrupting the direct power to the contactors C1, C2 and C3. However, the contact TD1B is closed providing power to the second time delay TD2. Its contacts TD2A and TD2B are maintained in the closed position until the second time delay has timed out. The second time delay typically has an interval of 5 minutes. During the interval of delay TD2, the contact TD1D of the first time delay is closed and thus the repeat cycle timer initiates its operation. This timer may be a conventional timer having a repeating cycle. Associated with this timer are contacts RCTA, RCTB, and RCTC. At the initiation of this timer, the contact RTCB is closed and thus power is provided to the contactors C1 and C2. At the same time the contact RCTA is opened and power is interrupted to the contactor C3. After an interval of operation of approximately 1 minute, the timer has its contacts reversed and thus power is then provided to the contactor C3 with power being interrupted to the contactor C1 and C2 through the contact RCTB. Thus, after the termination of the time delay period of delay TD1, the repeat cycle timer continues to operate on this one minute cycling basis. However, at the end of the 5 minute interval determined by the delay TD2 the ready light 44 is operated through the contacts TD1B and TD2C. Thus, at the end of a total of 30 minutes, the food is ready for serving. However, the cycling operation continues after that period for any trays that are still being maintained heated. At the end of delay TD2 its contacts TD2B opens extinguishing the indicator 47. Furthermore, at the same time the contacts TD2A opens to extinguish the indicator 46 indicating an end to the rethermalization interval which comprised the 25 minute interval plus the 5 minute interval.

After all of the trays have been used, they may be returned to the cart but would not be completely plugged in as it would not be desired to heat any of the empty trays. At that time the switch 34 may be changed back to its "load" position so as to reset the control means including the time delays TD1 and TD2.

Figure 4:
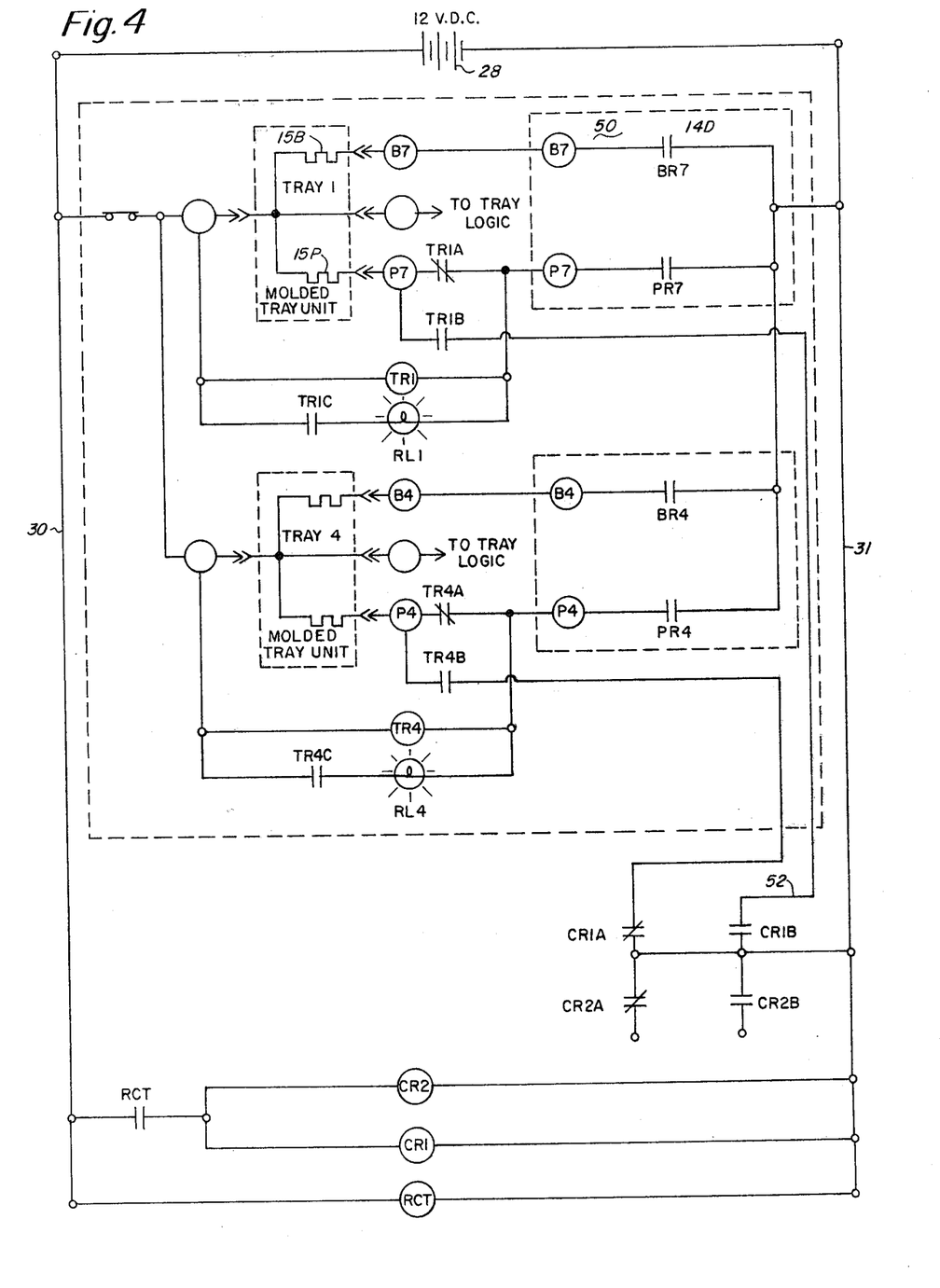
FIG. 4 is a circuit diagram of an alternate embodiment of the invention including cycle control.

FIG. 4 shows an alternate embodiment of the present invention which provides a "ready" indication associated with each tray position rather than an overall "ready" condition as with the first embodiment described in FIG. 2. In the embodiment of FIG. 4 for the sake of simplicity only two tray positions have been shown, it being understood that all other tray positions are of substantially the same construction. Also, in FIG. 4 like reference characters have been used to designate like components also found in FIG. 2. In the embodiment of FIG. 4 only the self contained battery source 28 is shown, it being understood, however, that external power may also be used with this arrangement and connected in a manner similar to that discussed previously with reference to FIG. 2. The output from the battery 28 couples to the power lines 30 and 31 for providing power to each of the individual trays and also to the repeat cycle timer RCT. Thus, in the embodiment of FIG. 4 the repeat cycle timer is operated all the time. The control for the embodiment of FIG. 4 is simpler than the control for the embodiment of FIG. 2. However, the individual logic circuitry associated with each tray is somewhat more complex.

In FIG. 4 each relay board 50 may contain circuitry similar to that shown and discussed previously in FIG.

3. Thus, with regard to tray #1 the relay board 50 may comprise a bowl button and a plate button each represented by a contact 14D (see FIG. 3) and each for coupling poer from line 31 to the bowl heater 15B and the plate heater 15P. In this embodiment the bowl heaters 15B are operated continuously as long as the bowl heater is selected by its associated switch. The plate heater 15P can be operated by way of two different paths including a path by way of contact TR1A directly from the board 50, or a second path by way of contact TR1B and the contactor contacts CR1A, CR1B, CR2A or CR2B. In FIG. 4 each of these contacts are shown as coupling to different trays for providing operation thereof.

When a tray is initially engaged in place on its rack the time delay relay TR1 is operated and during the time delay interval its contacts are maintained in the position shown in FIG. 4. Thus, initially during this continuous operation interval, the contact TR1A is closed while the contacts TR1B and TR1C are open thereby enabling continuous operation of the heater 15P. After the end of this continuous interval which may be 25 minutes, the timer relay TR1 terminates its operation and its contacts change position. The contact TR1C causes illumination of the ready light RL1. The contacts TR1A interrupts power from the board 50 and the contact TR1B now couples power to the plate heater 15P by way of line 52 from contact CR1B operated from the contactor CR1.

The repeat cycle timer may be a timer having equal 1 minute intervals as in the embodiment of FIG. 2 or may be adjusted to different types of intervals preferably operated at a 50% duty cycle to provide equal overall heating. During one portion of the cycle the contact RCT is open and during another portion the contact RCT is closed. When the contactors CR1 and CR2 are operated their associated contacts CR1A and CR2A are closed thus coupling power to the appropriate trays such as tray #4. Thereafter, when the contactors CR1 and CR2 fall out then the opposite contacts CR1B and CR2B are closed to provide power to the alternate trays. Thus, if all trays are in position, then essentially half of the trays have heating power applied thereto during one portion of the period and then the other half have power applied thereto during a second portion of the period of the repeat cycle timer. This flip-flop type action continues and the ready lights remain illuminated. However, it is understood that this repeat cycle timer operation only commences after the continuous portion of the cycle as defined by each of the individual time delay relays associated with each tray. In FIG. 4 only two tray positions are shown and these relays are identified as time delay relays TR1 and TR4.

If, for example, the tray #1 position is operated and thereafter the tray #4 position is operated, the 25 minute intervals will be the same but will have commenced at different periods of time. At the end of each interval the cycling operation continues so that at the end of the continuous (25 minute) interval the heating will be either interrupted or maintained for a short period of time depending upon the particular state of the repeat cycle timer at that time. However, once the continuous mode is terminated, sometime soon thereafter the control in accordance with the repeat cycle timer will take over.

In the embodiment of FIG. 2 after all of the meals have been served, the load/operate switch 34 may then be changed to its "load" position in order to reset the control system including the time delays and the repeat cycle timer. When switch 34 is moved to this position, the power is interrupted to the timer RCT. FIG. 4 shows an alternate form of operation and control which provides an essentially automatic resetting conditioned upon tray removal. In other words, the operation taught in FIG. 5 provides for a termination of the "operate" condition when all of the trays have been served.

Figure 5:
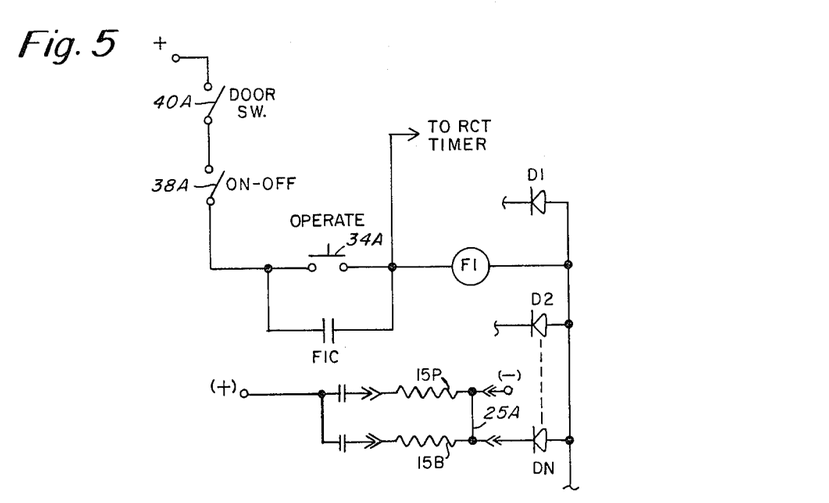
FIG. 5 shows a further featuer of the present invention in an electrical diagram showing means for sensing complete tray removal.

In FIG. 5 similar reference characters are used to identify similar components with regard to the circuitry shown in FIG. 2. The circuit arrangement of FIG. 5 is somewhat different than parts of the circuit arrangement of FIG. 2 but the principle of operation is basically the same. In FIG. 2 the switch 34 coupled to the opposite polarity side of the source as the on/off switch 40. However, in FIG. 5 it is noted that both the switch 38A and the switch 40A couple directly in series from, in this case, the positive terminal of the battery. The switch 40A is a door interlock switch and the switch 38A is the on-off switch. These switches couple to one of the fixed terminals of momentary switch 34A. The other side of switch 34A couples to relay F1. A contact F1C of relay F1 couples across the momentary switch 34A and functions as a holding contact so that even when the momentary switch is released, a holding path exists through this contact for the relay F1. One side of the switch 34A also couples to the RCT timer as in an embodiment of FIG. 2.

FIG. 5 also depicts one of the tray positions including the heaters 15B and 15P. When the tray is in place, the conductive short 25A provides a path from, in this case, the negative terminal of the battery to the cathode of diode DN. Thus, if any one of the trays is in place, its associated conductive short 25A provides a path by ways of its associated diode for the relay F1. This condition will be maintained as long as there is at least one tray that has not yet been taken from the cart and served. Once the last tray is served then all of the trays are open-circuited and the relay F1 falls out releasing its associated contact F1C thus interrupting power to the RCT timer and the time delays such as the time delays TD1 and TD2 shown in FIG. 2.

Figures 6, 7:
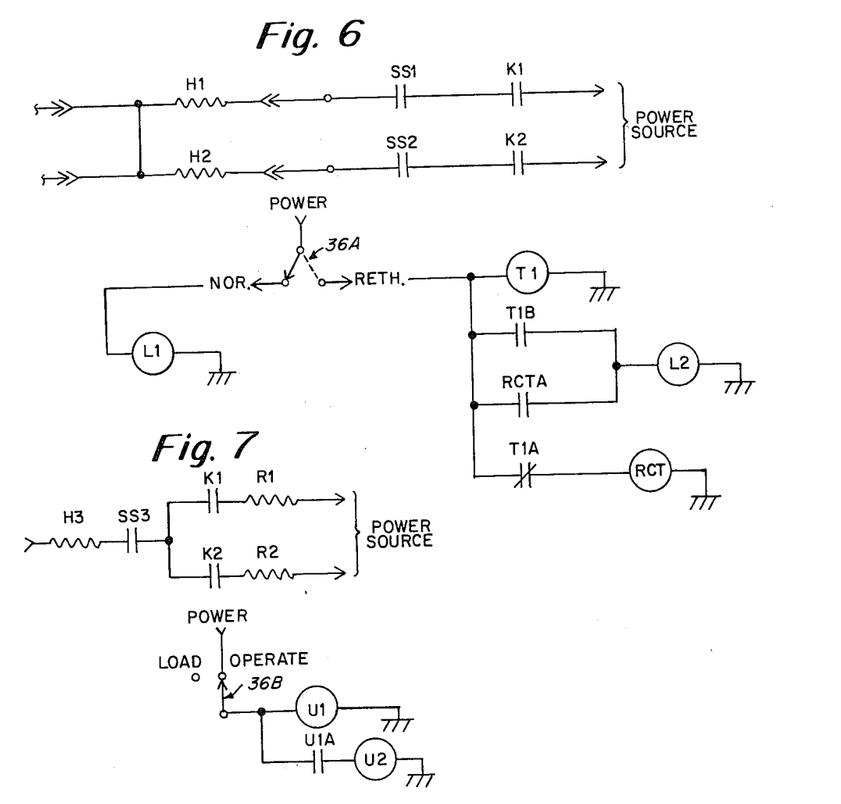
FIG. 6 is a circuit diagram of another embodiment of the invention employing two separate heaters.
FIG. 7 is still a further circuit diagram of an embodiment employing a single heater with two different levels of input power.

FIG. 6 shows a circuit diagram of a portion of an overall control system for controlling the heating of food on trays. The diagram of FIG. 6 may be used with such other components as described in FIG. 2B including control for the cart and drive motor. FIG. 6 shows the tray heaters H1 and H2 which may be of the identical type previously discussed in FIG. 2A and identified there as heaters 15B and 15P. In series with the heaters H1 and H2 are respective selection switches SS1 and SS2. In series with the selection switches are control contacts K1 and K2 which also couple to a power source. The contacts K1 and K2 are analogous to the contacts C1A, C2A and C3A shown in FIG. 2A.

FIG. 6 also shows the control switch 36A which receives power at a common contact and couples this power to either its normal output contact or its rethermalization output contact. When power is coupled to the normal contact this actuates solenoid or relay L1. The relay L1 has associated therewith the control contacts K1. Thus, when the control switch 36A is in its normal position, power is coupled by way of contact K1, and selection switch SS1 to the first heater H1. For normal operation, such as when the food has already been rethermalized or is normally served hot, it is preferred that the heat that is applied is of relatively low power. Thus, the heater H1 is designed as a lower wattage here than the heater H2. The heater H2 is the one that is activated when the control switch 36A is in its opposite position or the retherm position.

Thus, when the switch 36A is moved to its opposite position the relay L1 de-energizes opening the contact K1 and preventing any operation of heater H1. However, this operation of switch 36A activates the timer T1 and starts an initial time period which is an initial rethermalization phase which may be 25 minutes as previously described in connection with the first embodiment described. During this initial phase the contact T1B is closed and thus the solenoid or relay L2 is operated via the contact T1B. At the same time the contact T1A is open and the repeat cycle timer RCT is thus inactivated. During the initial rethermalization period the relay L2 is held energized during that entire period by the contact T1B. The control contact K2 is controlled from the relay L2 and thus during this initial rethermalization period power is continuously coupled by way of the contact K2 and the selection switch SS2 to the second heater H2 which, as previously mentioned is the higher wattage heater. This provides an initial continuous maximum heating current for providing quick rethermalization of the food.

At the termination of this initial period, the timer T1 times out and then the contact T1B opens while the contact T1A closes. When the contact T1A closes this activates the repeat cycle timer RCT and its corresponding contact RCTA alternates between open and closed positions at some presettable duty cycle to operate the relay L2 and in turn its associated contact K2 in a cycling manner.

FIG. 6 is a somewhat simplified diagram in that it shows only a single pair of heaters associated with one tray. In a system employing a number of trays then it is preferred that the repeat cycle timer of different sets of contacts with one set of contacts being open while the other set is closed so as to provide power to heaters of a first group of trays while power is interrupted to another group and then subsequently providing power to the other group while the first group is inactive.

FIG. 7 is a simplified circuit diagram showing another form of control that may be employed in accordance with the invention. This version employs a control switch 36B having a load position and an operate position. This switch is shown in the operate position coupling power to timer U1. This timer U1 controls contact K1 so that during the initial rethermalization period, as defined by timer U1, power is coupled by way of resistor R1, contact K1 and selector switch SS3 to the heater H3. The resistor R1 simulates use of some predetermined current coupled to the heater H3 for controlling the heating. The resistor R1 provides maximum heating current for this rethermalization initial phase. Thus, resistor R1 has a lower value than the second resistor R2. It is the second path including resistor R2 and contact K2 that controls the phase after the initial rethermalization. This is a lower power phase required for maintenance rather than for rethermalization. As previously mentioned, the initial rethermalization period is determined by the timer U1. When this period times out, such as after, for example, 25 minutes, then the contact U1A closes and the solenoid U2 is activated. When this occurs the contact K1 is opened and the contact K2 which is operated from the relay U2 closes, thus activating this second path for providing power by way of the resistor R2 to the heater H3.

In the preferred embodiment described herein, during the initial rethermalization mode, the power has been applied continuously to the heater to provide as rapid a thermalization as possible. However, adequate thermalization can also be provided by providing a cycling mode both for the initial phase of rethermalization and thereafter for temperature maintenance of the food. In this regard, it is preferred than the initial cycling be at a higher duty cycle than the maintenance cycling.

Figure 8:
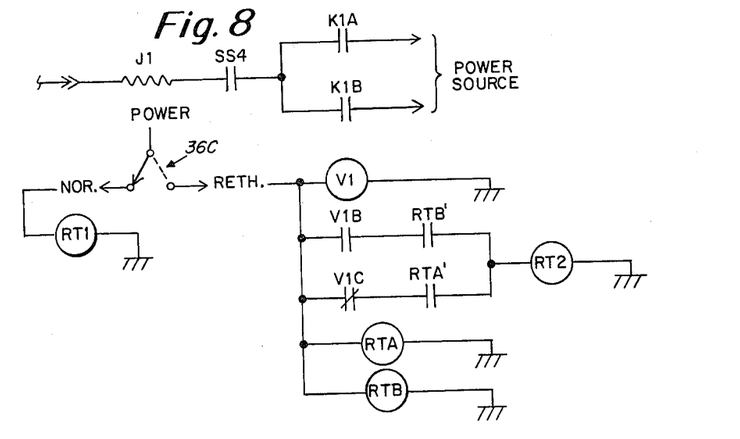
FIG. 8 is still another circuit diagram of a further embodiment employing different duty cycles of operation.

FIG. 8 shows the implementation for providing this type of cycling operation. In FIG. 8 there is shown the heater J1 coupled in series with the selection switch SS4 which in turn couples by way of two paths to a power source including either control contact K1A or control contact K1B. Contact K1A is controlled from the relay RT1 while contact K1B is controlled from the relay RT2. There is shown in FIG. 8 the control switch 36C having its normal and rethermalization position. In the normal position the relay RT1 is operated for as long as the switch is maintained in that position. As long as the relay is operated then the contact K1A is closed and power is provided only by way of contact K1A to the heater J1. The path including contact K1A may have associated therewith, means for reducing the current flow in this normal mode of operation depending upon the type of processing that is desired.

When the switch 36C is moved to its retherm position, the relay RT1 de-energizes and instead of control by way of contact K1A there is provided control by way of contact K1B. In this retherm position first the timer V1 is activated. This timer defines the initial period of rethermalization. While the timer V1 is timing out its contact V1B is closed and power may be coupled by way of contact V1B and contact RTB' to the relay RT2. The state of the contact RTB' depends upon the repeat cycle timer RTB which is essentially continuously activated. The timer RTB has a high duty cycle so that during the initial phase of rethermalization the relay RT2 is operated to its on state more than it is to its off state. Thus, the corresponding contact K1B is closed for a longer period of time than it is open.

After the timer V1 times out, demarcating the end of the initial phase, then the contact V1C closes and the contact V1B opens. Control is thus switched from repeat cycle timer contact RTB' to contact RTA'. Thus, the repeat cycle timer RTA now controls operation of the relay RT2. The timer RTA is a lower duty cycle timer providing the relay RT2 in its off state longer than it is in its on state. Thus, for food heat maintenance the contact K1B in this phase is held on for a shorter period of time than it is held open.

With the use of an on board battery, one of the important features of the present invention is in the nature of energy saving by alternate cycling of different heaters so that all heaters are not activated at the same time. This tends to reduce the drain upon the battery intending to equalize the battery drain. This lowers the peak power requirements from the battery and enables the use of a lower capacity battery and it is more efficient to operate the battery at lower peak powers. Furthermore, with the use of the AC source, the battery may also be saved whenever the AC source is available. However, for instances where the AC source is not available then the heating by the batteries directly is optimized by the use of the cycling operation, and in particular where groups of heaters are operated in sequence.

Having described a limited number of embodiments of this invention, it should now be apparent to those skilled in the art that numerous modifications can be made in these embodiments without departing from the scope of this invention. For example, in place of some of the electromechanical means shown herein, electronic circuit means can be used. For example, SCR circuits may be used in place of certain of the relays shown herein. Also, many different battery arrangements may be used and the polarities thereof may even be reversed with regard to the embodiment of FIG. 2 while of course, still maintaining the same potential difference across the heaters such as heaters 15B and 15P of FIG. 2.

What is claimed is:

1. A mobile food serving system for rethermalizing food and maintaining food temperature after rethermalization, said system comprising;
   mobile housing means having at least one tray supporting rack,
   an electrical energy source carried by and movable with the housing means,
   a tray removably supported on the rack and having a supporting surface for food containers,
   at least one food heater associated with the supporting surface and in thermal contact with a surface of the tray for good heat transfer thereto,
   selectable means in series with said heater for enabling coupling of energy source power to the heater,
   and control means coupled from the energy source for controlling food heating and temperature,
   said control means including manual mode control switch means having opposite mutually-exclusive single positions including a normal position associated with a normal heating period of the food, and a rethermalization position associated with a rethermalization period, means responsive to the normal operation position for coupling operating power to the food heater at a continuous rate with the switch means set at and maintained at said single normal position throughout said normal operation position, and first means responsive to the rethermalization position and including first timing means for coupling operating power to the food at a continuous rate for a predetermined interval of sufficient length to rethermalize the food at a first temperature range and second means responsive to termination of the predetermined interval for thereafter operating the heater at a lower power level to maintain the food heated to a second temperature range lower than the first temperature range, said switch means being set at and maintained at said single rethermalization position throughout both portions of said rethermalization period.

2. A system as set forth in claim 1 wherein said housing means is in the form of a motor powered cart.

3. A system as set forth in claim 1 including a second switch substantially in parallel with the first switch and having a first power interrupting position for the purpose of loading trays and a second operate position for coupling energy to the one switch.

4. A system as set forth in claim 1 wherein said first means includes a first time delay means defining the predetermined interval and the second means includes a second time delay means defining a second predetermined time interval.

5. A system as set forth in claim 4 wherein said second means includes cyclic operating means including a repeat timer having an "on" period and an "off" period.

6. A system as set forth in claim 5 including a plurality of heaters each associated with a tray upon which the meal is disposed and separate selectable means for each heater wherein said repeat timer operates some heaters "on" while other heaters are "off".

7. A system as set forth in claim 1 wherein said source includes a rechargeable battery and further including external power receive means and means responsive to said external power for coupling said external power to said heater.

8. A system as set forth in claim 1 including a plurality of heaters each having a separate control line and separate selectable switch means including a switch means for selecting each heater for operation.

9. A system as set forth in claim 8 including a group of at least two heaters associated with a tray upon which the meal is disposed, each heater of the group having a switch means for selection thereof.

10. A system as set forth in claim 8 wherein the heaters are operated after the predetermined time interval at a fifty percent duty cycle.

11. A system as set forth in claim 10 including ready light means associated with each heater.

12. A system as set forth in claim 10 including means for operating one of the heaters of a group continuously when selected and for operating the other heater of the group first continuously and thereafter cyclically.

13. A system as set forth in claim 8 including means for sensing a tray in position to receive power when so selected and means responsive to an absence of any tray being in power receiving position for terminating the cyclic operation.

14. A system for controlling a food heater comprising;
   means defining a source of electrical heating power,
   housing means having at least one tray supporting rack,
   a tray removably supported on the rack and having a supporting surface for food containers,
   a plurality of food heaters,
   and control means coupled from the source for controlling the heating power applied to the food heater,
   said control means comprising means for operating each heater at a continuous rate for a predetermined period of time to rethermalize the food and for operating said each heater cyclically on and off after the termination of said predetermined period of time to maintain the food hot,
   said plurality of heaters each associated with a tray upon which the meal is disposed and separate selectable means for each heater,
   said control means further comprising repeat cycle timer means to control the plurality of heaters so that some heaters are maintained operating while others are maintained off during a first phase of the food temperature maintenance period, and the other heaters are operated on while the said some heaters are operated off during a second phase of the food temperature maintenance period, and the other heaters are operated on while the said some heaters are operated off during a second phase of the food temperature maintenance period to thereby provide relatively uniform heat dissipation from the electrical heating source during said food temperature maintenance period.

15. A system as set forth in claim 14 wherein said control means operates said heater at a continuous cycling rate for said predetermined period of time.

16. A system as set forth in claim 15 wherein the cycling during said predetermined period of time is at a higher duty cycle than the cycling thereafter.

17. A system as set forth in claim 14 wherein said control means comprises means for operating said heater at different power levels during and after said predetermined period of time.

18. A system for controlling a food heater comprising;
a mobile cart having means for receiving a plurality of trays, with each tray having at least one food heater associated therewith,
means defining a source of DC power disposed aboard said mobile cart,
means for receiving an input AC power signal,
and control means having two states, and one state coupling DC power to the heater and the other state coupling input AC power to the heater,
said AC power and DC power being applied in a mutually exclusive manner,
and said control means being responsive to application of said AC power thereto to change from the first to the second state.

19. A system for controlling at least one food heater comprising;
means defining a source of electrical heating power,
housing means having at least one tray supporting rack,
at least one tray removably supported on the rack and having a supporting surface for food containers,
at least a pair of heaters associated with one tray,
control means coupled from the source for controlling the heating power applied to the food heaters,
said control means comprising first means for operating one of said heaters at a continuous rate under normal operation on a low wattage basis, and second means for operating the other heater of said pair of heaters to rethermalize the food under rethermalization operation at a continuous rate for a predetermined period of time to rethermalize the food on a higher wattage basis including means for thereafter operating said other heater at a lower wattage basis to maintain food temperature,
and switch means for mutually exclusively selecting one of said first and second means.

20. A system as set forth in claim 21 wherein the current limiting means each include a resistor with the first resistor smaller than the second to provide a first heat level greater than the second heat level.

21. A system for controlling at least one food heater comprising;
means defining a source of electrical heating power,
housing means having at least one tray supporting rack,
at least one tray removably supported on the rack and having a supporting surface for food containers,
at least one heater associated with the tray,
a pair of current limiting means,
means disposing the current limiting means parallel and coupled to the heater,
and control means coupled from the source for controlling the heating power applied to the food heater,
said control means comprising first timer means for coupling heating power to one of said current limiting means for a predetermined rethermalization period, said one current limiting means adapted to provide a first heating level, and second means responsive to termination of said rethermalization period for coupling heating power to the other of said pair of current limiting means, said other current limiting means adapted to provide a second heating level less than said first heating level for food temperature maintenance.

22. A system for controlling at least one food heater comprising;
means defining a source of electrical heating power,
housing means having at least one tray supporting rack,
at least one tray removably supported on the rack and having a supporting surface for food containers,
at least one heater associated with the tray,
means defining a first control path to the heater,
means defining a second control path to the heater,
means disposing the first and second paths in parallel,
and control means coupled from the source for controlling the heating power applied to the food heater,
said control means comprising first timer means for coupling heating power to said first path for a predetermined rethermalization period on a cycling basis and at a first duty cycle, and second means responsive to termination of said rethermalization period for coupling heating power to said second path on a cycling basis and at a second duty cycle lower than said first duty cycle for food temperature maintenance.

* * * * *